United States Patent Office 2,803,670
Patented Aug. 20, 1957

2,803,670

PREPARATION OF POLYHALO PHENOLS

Alexander Galat, Yonkers, N. Y., assignor to Ringwood Chemical Corporation, Ringwood, Ill., a corporation of Illinois No Drawing. Original application November 12, 1952, Serial No. 320,153. Divided and this application August 1, 1956, Serial No. 601,340

2 Claims. (Cl. 260—623)

This invention relates to a new and novel process for the preparation of polyhalo phenols.

This application is a division of my copending application, Serial Number 320,153, filed November 12, 1952.

Due to the strong ortho-para orientating influence of the hydroxyl group of phenol, it is impossible to prepare 2,4,5-trichlorophenol by direct chlorination of phenol, the symmetrical 2,4,6-trichlorophenol being obtained instead. Accordingly, 2,4,5-trichlorophenol is best prepared by an indirect route, usually involving hydrolysis of any one of the four chlorine atoms of 1,2,4,5-tetrachlorobenzene.

As would be expected, the halogen atoms of 1,2,4,5-tetrachlorobenzene are firmly held and accordingly the compound is quite resistant to hydrolysis. Some formation of the desired phenol can be achieved by hydrolysis with dilute aqueous alkali at extremely high temperatures and pressures. However, this procedure requires special, very strong and very expensive equipment and, due to the drastic reaction conditions, considerable formation of byproducts occurs, one being 2,2′,4,4′,5,5′-hexachloro diphenyl oxide. The high pressure-high temperature hydrolysis of 1,2,4,5-tetrachlorobenzene with sodium hydroxide in methanol exhibits similar disadvantages. In this hydrolytic reaction a considerable amount of 2,4,5-trichloroanisole is produced as byproduct.

It has been proposed to hydrolyze 1,2,4,5-tetrachlorobenzene at elevated temperatures but at atmospheric pressure through use of sodium hydroxide in a polyhydric alcohol such as glycerol or a glycol. Such a process is quite satisfactory with respect to operability and yields but suffers from the disadvantage that large quantities of the reaction medium are necessary for successful results, for example, at least 2.0 pounds of the polyhydric alcohol per pound of 1,2,4,5-tetrachlorobenzene, preferably about 3.5 pounds of the polyhydric alcohol per pound of 1,2,4,5-tetrachlorobenzene. This means that the reaction medium is several times as valuable as the reactant employed or the product produced by the reaction so that the successful operation of the process is largely an exercise in solvent recovery, the production of 2,4,5-trichlorophenol being incidental. Also, because of the large volume of reaction medium required, equipment of relatively great capacity is required to achieve only moderate production of the desired phenol.

One object of this invention is to provide a new and novel process for the production of polyhalophenols from polyhalobenzenes.

A further object of this invention is to provide a new and novel process for the preparation of 2,4,5-trichlorophenol from 1,2,4,5-tetrachlorobenzene.

Additional objects of this invention will become apparent as the description thereof proceeds.

Broadly and briefly, in accordance with one specific aspect of this invention, 1,2,4,5-tetrachlorobenzene is hydrolyzed to 2,4,5-trichlorophenol by heating the chlorinated hydrocarbon with an alkali metal hydroxide such as sodium hydroxide or potassium hydroxide in a reaction medium consisting of a polyhydric alcohol containing a material unreactive with the reaction medium and the reactants and capable of entraining water on distillation. When the hydrolysis is complete or essentially complete (as indicated by complete or essentially complete solubility of the reaction mixture in water), the phenol may be isolated from the reaction medium by classical procedures.

The process of this invention, broadly and briefly described above, involves the production of some water, resulting from the reaction of the polyhydric alcohol with the alkali metal hydroxide to form an alkali metal derivative. It has been discovered that this water has a pronounced inhibiting action on the hydrolytic reaction and to reduce such inhibiting action as much as possible the prior art procedures have maintained the water concentration at a low level by use of large volumes of reaction medium. As previously set forth, satisfactory results are obtained in prior art procedures only by using at least two pounds polyhydric alcohol and preferably about 3.5 pounds polyhydric alcohol per pound of 1,2,4,5-tetrachlorobenzene. In accordance with this invention, water formed in the process of this invention is rapidly removed by distillation of the entraining agent and in consequence highly successful results are obtained when as little as 0.5 to 0.6 pound or even less, of polyhydric alcohol is employed per pound of 1,2,4,5-tetrachlorobenzene. This results in many advantages. Equipment of relatively small size is capable of producing relatively large quantities of the desired product. Recovery of the reaction medium is greatly simplified with respect to size of equipment, heat and power requirements and the like. If desired, recovery of the reaction medium may be omitted entirely without too much effect on costs.

For the better understanding of this invention the following illustrative but non-limiting example thereof is given:

*Example 1*

Two hundred and sixteen parts by weight (one mole) 1,2,4,5-tetrachlorobenzene, 88 parts by weight sodium hydroxide (2.2 moles), 125 parts by weight propylene glycol and about 40–45 parts by weight toluene are placed in a reaction vessel provided with an agitator and a total condenser discharging to a water trap provided with an automatic return line to the reaction vessel for non-aqueous distillate. The mixture is stirred and gradually heated until all sodium hydroxide has dissolved, the temperature being held at 125–135° C. until solution of sodium hydroxide is complete. After the sodium hydroxide has dissolved, the water trap is filled to the level of the automatic return line with toluene and the reaction mixture is gradually heated to 150° C. and maintained at this temperature until a sample of the reaction mixture is almost completely or is completely soluble in ten volumes of water. During the reaction period, water is removed from the water trap when required. After completion of the reaction, the reaction mixture is worked up in accordance with standard procedures for isolation of the phenol. Thus, the reaction mixture may be cooled to around room temperature, treated with 70–75 parts by weight concentrated sulfuric acid and then added to some 3000 parts by weight of water. The crude phenol is separated by filtration, washed and dried. It may be purified by vacuum distillation if desired. The reaction medium may be recovered from the filtrate by removing water under vacuum. The yield of 2,4,5-trichlorophenol is 80% theory, based on 1,2,4,5-tetrachlorobenzene.

The temperature during hydrolysis may be varied over wide limits, for example, from 140° to 200° C., more or less. As would be expected, the time required to complete the hydrolysis varies inversely with the reaction temperature; thus, at 200° C., the reaction is complete or essentially complete after three hours while at 160–165° C. some 7–8 hours are required.

When it is desired to operate at high temperatures it may be difficult or impossible to achieve such high temperatures with the proportions given in this example. However, by omitting a portion of the toluene, the desired temperature may be reached. Or, in the early stages of the reaction, sufficient toluene may be removed from the water trap (along with water that has collected) to produce a reaction mixture of the proper composition to give the desired reaction temperature.

While toluene has been specified in this example, any material that is unreactive with the reaction medium or the reactants and capable of entraining water during distillation may be employed. However, aromatic hydrocarbons, such as benzene, toluene and the xylenes are readily available and inexpensive materials meeting these criteria so the use of one of these entraining agents is preferred. It should be noted however that the xylenes have a rather high boiling point and accordingly are not too suitable for use if the hydrolysis is conducted at a temperature in the lower portion of the range previously given and accordingly toluene or benzene are preferably employed. Xylenes however are eminently suitable for use if the hydrolysis is conducted at a temperature in the upper portion of the range previously given.

While propylene glycol is employed in the previous example as the reaction medium for the hydrolysis of 1,2,4,5-tetrachlorobenzene, this invention is not restricted thereto, polyhydric alcohols in general being operative such as glycol and glycerol. However, all points of view considered, propylene glycol appears best for the purpose. Glycol, for example, appears to be attacked to a certain extent by sodium hydroxide at the concentrations used and under the temperatures that prevail.

While this invention has been described in connection with the hydrolysis of 1,2,4,5-tetrachlorobenzene to 2,4,5-trichlorophenol, it is not limited thereto. Thus, 1,2,4-trichlorobenzene, when treated in accordance with this invention, gives rise to 2,5-dichlorophenol.

Similarly, 1,2,3,5-tetrachlorobenzene may be hydrolyzed to 2,3,5-trichlorophenol and pentachlorobenzene to 2,3,-5,6-tetrachlorophenol together with some 2,3,4,5-tetrachlorophenol.

Some polyhalobenzenes are difficult to prepare and/or are difficult to hydrolyze. The dihalobenzenes are difficult to hydrolyze by the process of this invention and when hydrolyzed produce monohalogenated phenols and accordingly are excluded from the purview of this invention. 1,2,3,4-tetrachlorobenzene is very difficult to prepare and accordingly is of no practical interest although it can be hydrolyzed with relative ease. Hexachlorobenzene is difficult to hydrolyze but it can be hydrolyzed to produce pentachlorophenol.

The corresponding polybromo and polyiodobenzenes are more easily hydrolyzed than the polychlorobenzenes to polyhalophenols. However, due to the relatively high cost of the polybromo and polyiodobenzenes, they are hardly of practical interest.

The types and characteristics of suitable entraining agents have been discussed previously. When conditions are propitious, one of the reactants may be used as the entraining agent. Thus, in the hydrolysis of 1,2,4-trichlorobenzene, this polyhalobenzene may be made to serve as the entraining agent as well as a reactant. However, its boiling point is rather high (213° C.) so that it is necessary to conduct the reaction at a high temperature in order to have the 1,2,4-trichlorobenzene serve both as an entraining agent and a reactant. The other trichlorobenzenes are even less suitable as combined reactants-entraining agents as they are solids at room temperature which results in some difficulty in returning them from the water trap to the reaction vessel.

In the example previously set forth the polyhydric alcohol, alkali metal hydroxide, entraining agent and polyhalobenzene were all present at the initiation of the reaction. This procedure is convenient but is not essential and the invention is not limited thereto. If desired, the polyhydric alcohol, alkali metal hydroxide and entraining agent may be boiled until water is no longer evolved, following which the polyhalobenzene is added (if desired, subsequent to the removal of entraining agent present) and the hydrolytic action is then allowed to proceed. The reaction occurs in two quite well defined steps. The first involves the production and elimination of water. This step proceeds comparatively rapidly and during this stage very little hydrolysis of the polyhalobenzene occurs due to the previously mentioned inhibiting action of the water. After the water has been eliminated, the slower hydrolytic reaction begins. Obviously, it is not necessary to have the polyhalobenzene present during the water production and elimination stage nor is it necessary to have an entraining agent present during the subsequent hydrolysis stage but as will be obvious from the preceding example no harm is done if the polyhalobenzene is present in the first stage and if entraining agent is present in the second and it is usually more convenient to operate in this manner.

Obviously, if desired, the production and elimination of water may be dispensed with if the required alkali metal derivative of the polyhydric alcohol is prepared by the interaction of the polyhydric alcohol with the appropriate amount of alkali metal. However, since alkali metals are considerably more expensive than the corresponding alkali metal hydroxides and since the production and elimination of water in accordance with the procedures previously described is a rapid and simple process it is usually more economic to form the alkali metal derivative of the polyhydric alcohol as has been described in the example.

Be it remembered, that while this invention has been described in connection with specific details and a specific example thereof, these are illustrative only and are not to be considered limitations on the spirit or scope of said invention except in so far as these may be incorporated in the appended claims.

I claim:

1. The process of preparing 2,4,5-trichlorophenol, comprising forming a mixture of an alkali metal hydroxide, a polyhydric alcohol selected from the group consisting of glycol and propylene glycol, 1,2,4,5-tetrachlorobenzene and an entraining agent, said entraining agent being unreactive with the other compounds of said mixture, said mixture being further characterized by the fact that the weight of polyhydric alcohol therein is from 0.5 to 1.25 times the weight of 1,2,4,5-tetrachlorobenzene therein, heating said mixture with removal of entraining agent and water entrained thereby, continuing heating the resulting anhydrous reaction mixture for a time sufficient to hydrolyze a chlorine atom of said 1,2,4,5-tetrachlorobenzene and recovering 2,4,5-trichlorophenol from the resulting reaction mixture.

2. The process of preparing 2,4,5-trichlorophenol, comprising forming a mixture an alkali metal hydroxide, a polyhydric alcohol selected from the group consisting of glycol and propylene glycol and an entraining agent, said entraining agent being unreactive with the other components of said mixture, heating said mixture with removal of entraining agent and water entrained thereby, adding 1,2,-4,5-tetrachlorobenzene to the resulting anhydrous reaction mixture, the weight of polyhydric alcohol in the mixture so formed being from 0.5 to 1.25 times the weight of 1,2,4,5-tetrachlorobenzene therein, continuing heating for a time sufficient to hydrolyze a chlorine atom of said 1,2,4,5-tetrachlorobenzene and recovering 2,4,5-trichlorophenol from the resulting reaction mixture.

No references cited.